(12) United States Patent
Kapeliouchko et al.

(10) Patent No.: US 6,576,703 B2
(45) Date of Patent: Jun. 10, 2003

(54) PROCESS FOR THE PREPARATION OF AQUEOUS DISPERSIONS OF FLUOROPOLYMERS

(75) Inventors: Valery Kapeliouchko, Alessandria (IT); Enrico Marchese, Asti (IT)

(73) Assignee: Ausimont S.p.A., Milan (IT)

( * ) Notice: Subject to any disclaimer, the term of this patent is extended or adjusted under 35 U.S.C. 154(b) by 45 days.

(21) Appl. No.: 09/789,728

(22) Filed: Feb. 22, 2001

(65) Prior Publication Data

US 2001/0020063 A1 Sep. 6, 2001

(30) Foreign Application Priority Data

Feb. 22, 2000 (IT) ...................................... MI2000A0314

(51) Int. Cl.⁷ ........................ C08L 27/12; C08F 114/26; C08F 214/26; C08K 5/06
(52) U.S. Cl. ...................... 524/805; 524/366; 524/835; 526/242; 526/250
(58) Field of Search ................................ 524/805, 835, 524/366; 526/242, 250

(56) References Cited

U.S. PATENT DOCUMENTS

| | | |
|---|---|---|
| 2,242,218 A | 5/1941 | Auer |
| 3,009,892 A | 11/1961 | Duddington et al. |
| 3,391,099 A | 7/1968 | Punderson |
| 3,526,614 A | 9/1970 | Schindler |
| 3,665,041 A | 5/1972 | Sianesi et al. |
| 3,715,378 A | 2/1973 | Sianesi et al. |
| 3,810,874 A | 5/1974 | Mitsch et al. |
| 3,925,292 A | 12/1975 | Holmes |
| 4,038,230 A | 7/1977 | Mueller et al. |
| 4,380,618 A | 4/1983 | Khan et al. |
| 4,385,157 A | 5/1983 | Auclair et al. |
| 4,657,966 A | 4/1987 | Mallya |
| 4,864,006 A | 9/1989 | Giannetti et al. |
| 4,990,283 A | 2/1991 | Visca et al. |
| 5,523,346 A | 6/1996 | Wu |
| 5,576,381 A | 11/1996 | Bladel et al. |
| 5,688,207 A | 11/1997 | Uchida et al. |
| 5,789,083 A | 8/1998 | Thomas |
| 5,789,508 A | 8/1998 | Baker et al. |

FOREIGN PATENT DOCUMENTS

| | | |
|---|---|---|
| EP | 0 148 482 A2 | 7/1985 |
| EP | 0 239 123 A2 | 9/1987 |
| EP | 0 617 058 A | 9/1994 |
| EP | 0 969 027 A1 | 1/2000 |
| WO | WO 96/22315 | 7/1996 |
| WO | WO 97/08214 | 3/1997 |
| WO | WO 98/58984 | 12/1998 |

OTHER PUBLICATIONS

"The Dependence of Synthetic Latex Viscosity on Particle Size and Size Distribution", Transactions of the Society of Rheology, Brodnyan, 12:3, 1968, pp 357–362.

"Rheology of Concentrated Suspensions", Chong et al, Journal of Applied Polymer Science, vol. 15, 1971, pp 2007–2021.

"Functional Polymers for Colloidal Applications. V. Novel Behavior of Polymeric Emulsifiers in Emulsion Polymerization", Kuo et al, Journal of Polymer Science: Part A: Polymer Chemistry, vol. 31, 1993, pp 99–111.

"Effect of Particle Size Distributions on the Rheology of Concentrated Bimodal Suspensions", Chang et al, The Society of Rheology, Inc., vol. 38, 1994, pp 85–98.

"Emulsion Polymerization and Emulsion Polymers", Lovell et al, J. Wiley & Sons, Chichester, 1997, p. 450.

"Rheology of Concentrated Multi–Sized poly (St/BA/MMA) Latices", Chu et al, Colloid Polym. Sci., vol. 276, 1998, pp 305–312.

"High Solid Content Multisized Emulsion Copolymerization of Styrene, Butyl Acrylate, and Methacrylic Acid", Chu et al, Journal of Applied Polymer Science, vol. 70, 1998, pp 2667–2677.

"Characterization of Particle Size and Size Distribution of Multi–Sized Polymer Lattices by Centrifugation Plus Quasielastic Light Scattering", Chu et al, Colloid. Polym. Sci., vol. 275, 1997, pp 986–991.

"The Molecular Structure of Perfluorocarbon Polymers. Infrared Studies on Polytetrafluoroethylene", Moynihan, J. Am. Chem. Soc., vol. 81, 1959, pp 1045–1050.

*Primary Examiner*—Tae H. Yoon
(74) *Attorney, Agent, or Firm*—Arent Fox Kintner Plotkin & Kahn PLLC

(57) ABSTRACT

Process for the preparation of a dispersion based on homopolymers/copolymers of tetrafluoroethylene (TFE), said dispersion having a bimodal or multimodal distribution of the particle diameters, wherein the fraction of small particles is in the range 1.5–35% by weight calculated on the dry product; the ratio between the average diameter of the small particles with respect to the average diameter of the dispersion obtained from the polymerization being in the range 0.02–0.6; said process comprising the following essential steps:

(a) preparation of an aqueous microemulsion comprising fluorinated surfactants and (per)fluoropolyether oils (PFPE);

(b) feeding of the microemulsion into the polymerization reactor;

(c) feeding of at least one fluorinated surfactant.

18 Claims, No Drawings

PROCESS FOR THE PREPARATION OF AQUEOUS DISPERSIONS OF FLUOROPOLYMERS

The invention relates to a process for the preparation directly from polymerization of fluoropolymers aqueous dispersions, having a multimodal or bimodal distribution of the particle sizes and to the dispersion obtainable by a high conversion preparation process; said dispersions having an average diameter in the range 100 nm–400 nm, preferably 150 nm –300 nm, the fraction of small particles having diameter between 10 and 100 nm is in the range 1.5–35% by weight, preferably 3–259 by weight; the ratio between the average diameter of the small particles with respect to the average diameter of the dispersion obtained from the polymerization being in the range 0.025–0.6.

In particular the invention relates to a radical polymerization process of tetrafluoroethylene (TFE) and copolymers thereof in aqueous emulsion, using a specific dosage of surfactants of which at least one is a component of a microemulsion.

From the literature (J. G. Brodnyan, Trans. Soc. Rheology, 12:3 (1968), 357; J. S. Chong, E. B. Christiansen, A. D. Baer, J. Appl. Pol. Sci., v.15 (1971), 2007; P. -L. Kuo, C. -J. Chen, J. Polymer Sci. Pol. Chemistry, 31 (1993), 99; C. Chang, R. L. Powell, J. Rheol., 38 (1994), 85; Emulsion polymerization and emulsion polymers. Ed. A. Lovell, M. S. El-Aasser, J. Wiley & Sons, Chichester, 1997, p. 450) it is known that polymeric latexes with a bimodal distribution of the particle diameters with respect to those with a monomodal distribution have a lower viscosity, the concentration being equal. This allows to obtain latexes having a higher concentration not exceeding a certain viscosity, for example up to 74% by volume with a viscosity lower than 1,000 cP. This leads, for example, to a better capability of the film formation and better tensile properties of the film.

Lately (F. Chu, J. Guillot, A. Guyot, Colloid. Polym. Sci., 276 (1998), 305; F. Chu, J. Guillot, A. Guyot, J. Applied Polymer Sci., 70 (1998), 2667) it has been shown for the polymers based on styrene, butyl acrylate and methyl-methacrylic acid, that latexes with multimodal, in particular trimodal, distributions of the particle diameters, have more advantageous rheological and colloidal properties with respect to bimodal latexes and much more advantageous with respect to monomodal latexes. For example, a latex can be obtained having a solid content up to 80% by volume and minimum viscosity in the case of trimodal distribution of the particle diameters with ratio by weight among large/average/small particles equal to 80/10/10.

The above mentioned literature and U.S. Pat. No. 4,657, 966, U.S. Pat. No. 4,385,157, U.S. Pat. No. 5,668,207 refer to hydrogenated polymer latexes and fluoropolymer latexes are not mentioned.

In U.S. Pat. No. 5,576,381 it is described how to obtain PTFE latexes with a bimodal distribution of the particle diameters by mixing a latex having a particle diameter in the range 180 nm—400 nm with another latex having an average diameter in a ratio from 0.3 to 0.7 with respect to the particle diameter of the first latex. The process requires the carrying out of two separate polymerization operations with a subsequent mixing in a specific ratio. This complicates the production process, since it requires the separate production of two types of latex and the increase of the storage volumes. Besides, the latex polymerization process with small particles requires to work at a low polymerization conversion, i.e. with low productivity, and it does not allow to obtain the particles having a diameter lower than 100 nm with the typical conversions of the industrial scale. As operating example the preparation of a latex having an average particle diameter of 100 nm the conversion being 10% by weight, is reported. In this patent it is stated that the fluoropolymer latexes with bimodal distribution of the particle sizes can be obtained by carrying out a polymerization reaction with subsequent additions of a surfactant. No example is reported on this aspect. From the examples, bimodal or multimodal distributions of the particle diameters are not obtained from the polymerization. On the other hand, it is known that subsequent additions of surfactants commonly used for the polymerization of tetrafluoroethylene based fluoropolymers, as for example described in U.S. Pat. No. 3,009,892 and U.S. Pat. No. 3,391,099 with the purpose to increase the latex stability and the conversion, do not give bimodal or multimodal distributions of the particle diameters. Experiments carried out by the Applicant (see comparative Examples) have shown that by using during the PTFE polymerization subsequent additions of ammonium perfluorooctanoate or of ammonium salt of perfluoropolyether acid as surfactants, multimodal distributions are not obtained.

The patent application WO 98/58984 mentions the possibility to obtain fluoropolymer latexes having a bimodal distribution of the particles directly from the polymerization but it is not indicated anyway how this result can be obtained.

U.S. Pat. No. 4,864,006 uses a microemulsion based on (per)fluoropolyethers for the polymerization of fluorinated polymers and indicates that all the surfactant necessary for the polymerization is fed into the reactor under the form of microemulsion. Besides, it is indicated that the whole microemulsion must be introduced into the reactor before the starting of the reaction. The amount of the used microemulsion must be higher than 0.05 ml of perfluoropolyether for 1 liter of water. Tests carried out by the Applicant (see comparative Examples) have shown that by operating under the conditions indicated in the patent dispersions with multimodal distributions of the particle diameters are not obtained.

In U.S. Pat. No. 4,380,618, U.S. Pat. No. 5,789,508 and WO 97/08214 for the PTFE polymerization and copolymers thereof surfactants of formula:

F—(CF$_2$—CF$_2$)$_n$—CH$_2$—CH$_2$—SO$_3$M, wherein M=H, NH$_4$, Na, Li, K are used. Multimodal distributions of the particle diameters are not obtained (see the Examples).

In U.S. Pat. No. 4,038,230 it is described how to obtain large spherical PTFE particles by using a non reactive perfluorinated oil phase, for example perfluorobutane, together with the surfactant. Multimodal distributions of the particle diameters are not reported.

In U.S. Pat. No. 3,526,614 in order to obtain a sufficiently large particle diameter, the addition of polivalent metal salts, such as $Zn^{2+}$, is used. This technique allows to control the final diameter of the PTFE particles, but multimodal distributions of the particle diameters are not reported.

U.S. Pat. No. 5,523,346 uses for the PTFE polymerization a microemulsion based on polymerizable unsaturated liquid monomers in order to obtain small PTFE particles. This method does not allow to obtain multimodal distributions of the particle diameters. Besides, it is well known that by operating under these conditions it is extremely dangerous due to the explosiveness of the liquid tetrafluoroethylene.

In patent application WO 96/22315 a perfluorinated microemulsion is used in order to obtain small particles of thermoprocessable fluoropolymers. Multimodal distributions of the particle diameters are not obtained.

U.S. Pat. No. 3,925,292 and U.S. Pat. No. 5,789,083 relate to a mixture formed by a dispersion of PTFE and by a dispersion of a thermoplastic copolymer of tetrafluoroethylene. In said patents it is neither reported nor described that the obtained single latexes have a multimodal distribution of the particle diameters. It is not indicated that said mixture can be directly obtained from the polymerization process.

In EP 969,027 in the name of the Applicant, a polymerization process in microemulsion to obtain PTFE particles or PTFE copolymers having a size 5–60 nm, is described. Bimodal distribution is not described.

The need was felt of a polymerization technique able to give PTFE dispersions having a multimodal distribution as defined below.

It is therefore an object of the present invention a process for the preparation of a dispersion based on tetrafluoroethytlene (TFE) homopolymers, or based on copolymers thereof with one or more monomers containing at least one unsaturation of ethylene type in amounts from 0 up to 10% by moles, preferably from 0 to 2% by moles, said dispersion having a multimodal or bimodal, preferably bimodal, distribution of the particle diameters, the dispersion having an average diameter in the range 100 nm–400 nm, preferably 150 nm–300 nm, the fraction of the small particles having diameter between 10 and 100 nm being in the range 1.5–35% by weight calculated on the dry product, preferably 3–25% by weight; the ratio between the average diameter of the small particles with respect to the average diameter of the dispersion obtained from the polymerization being in the range 0.025–0.6; said process comprising:

(a) preparation of an aqueous microemulsion comprising fluorinated surfactants and (per)fluoropolyether (PFPE) oils having non reactive, preferably (per)fluorinated, end groups, optionally containing 1 or more H and/or Cl atoms instead of fluorine;

(b) feeding of the microemulsion into the polymerization reactor before the beginning of the polymerization or when polymerization has started;

(c) feeding of at least one fluorinated, preferably perfluorinated, surfactant into the reactor before the starting of the polymerization or when polymerization has started;

(d) addition of water (reaction medium) into the reactor, reactor pressurization with gaseous TFE, optional addition of comonomers, chain transfer agents, stabilizers;

(e) addition of the initiator, and optionally during the polymerization of further amounts of comonomers, initiators, chain transfer agents;

(f) discharge from the reactor of the polymer latex; before the starting of the reaction at least a part of the (b) and/or (c) feedings must be carried out.

With the process of the invention a Latex containing a high concentration of polymer, generally higher than 259 by weight, preferably higher than 30W by weight, is obtained.

The Applicant has surprisingly found that by using a dosage system of at least two surfactants of which one is a component of a microemulsion (a) based on (per) fluoropolyethers and the other is a fluorinated surfactant not in microemulsion, PTFE latexes having a multimodal or bimodal distribution of the particle diameters are directly obtained from the polymerization process of the invention.

The fraction and the diameter of the small particles are obtainable from the supernatant layer of the polymerization latex subjected to ultracentrifugation.

Preferably the amount of the surfactant fed before the starting of the polymerization must exceed 0.05 grams for liter of water, while the total amount of the fed surfactant is generally in the range 0.3–10 g for liter of water.

The amount of the fluorinated surfactant in the microemulsion (a) is in the range 1–80% by weight, preferably 1–45% by weight, with respect to the total weight of surfactants (a)+(c).

The fluorinated surfactant used in step (c) is preferably anionic.

It is possible to check that the granulometric distribution curve of the latex particles has at least two separate peaks (bimodal distribution) by a scanning electronic microscope (SEM) or transmissiom electronic microscope (TEM) or by an atomic force microscope (AFM). Another method is that to use one or more ultracentrifugations of the polymerization latex.

The latex discharged from the reactor can be subjected, if desired, to the usual post-treatments in connection with the specific uses. For example, the discharged dispersion can be coagulated to obtain fine powders having the multimodal distribution according to the present invention. The latex concentration, carried out for example by clouding or ultrafiltration, can also be mentioned.

In order to obtain trimodal or higher distributions of the particles, a fluorinated surfactant (c) and the microemulsion (a) must be fed into the reactor at different reaction progress degrees. For example a feeding of the microemulsion (a) and of the surfactant (c) before the starting of the reaction, a further feeding of microemulsion a) when more than 50% of tetrafluoroethylene has reacted.

The Applicant has found that the various obtained populations of the polymer have different not only the particle diameters, but also some properties, such as molecular weight, crystallinity, etc. can be different.

For example, by using together with the microemulsion a specific dosage of comonomers, initiators and chain transfer agents, latexes can be obtained which besides containing a fraction of large particles formed by PTFE or modified PTFE, having a sufficiently high molecular weight such as to be not thermoplastic, contain at least one fraction of small particles formed by a thermoplastic fluoropolymer based on TFE, i.e. a fluoropolymer having a viscosity of the melt lower than $10^7$ poise, preferably from $10^3$ to $10^7$ poise. In order to obtain the large particle fraction having a sufficiently high molecular weight, the microemulsion dosage with initiators, comonomers and chain transfer agents must be fed at a reaction progress degree of at least 60%, preferably 80%.

The results of the invention are particularly surprising since the particle nucleation mechanism in polymerization processes in emulsion or in microemulsion is very complex and it is not clarified. The processes leading to the formation of small and large particles influence each other. It is surprising that by the process of the invention multimodal distributions as above defined are obtained.

The dispersions obtained by the process of the invention, as such or after post-treatment, can be used for the coating of surfaces of organic and/or inorganic polymers, of metals or ceramics, etc. with the advantage to have a better filming with respect to the dispersions having a monomodal distribution of the particles. Besides, the films obtained from the invention dispersions, show also higher tensile properties with respect to the commercial monomodal dispersions having a diameter in the range 180–400 nm.

The microemulsions (a) used in the process of the present invention are described in U.S. Pat. No. 4,864,006 and U.S.

Pat. No. 4,990,283, herein incorporated by reference, wherein instead of the indicated non reactive end groups, also hydrofluoropolyethers having one or both end groups containing one H atom, or having one or more chlorine atoms instead of fluorine in the chain end groups, can be used.

The perfluoropolyether oil phase of the microemulsion a) is present in an amount from 0.002 to 10 ml for liter of water, preferably from 0.01 to 2.5 ml.

The number average molecular weight of the perfluoropolyethers (PFPE) which can be used for the preparation of the microemulsion (a) is in the range 350–8,000, preferably 500–1,000. The perfluoropolyether chain comprises repeating units having at least one of the following structures, statistically placed along the chain:
(CFXO) ($CF_2CF_2O$), ($CF_2CF_2CF_2O$), ($CF_2CF_2CF_2CF_2C$), ($CR_4R_5CF_2CF_2O$), ($CF (CF_3) CF_2O$), ($CF_2CF (CF_3)O$),
wherein

X=F, $CF_3$;

$R_4$ and $R_5$, equal to or different from each other, are selected from H, Cl, or perfluoroalkyl from 1 to 4 carbon atoms.

In particular PFPE can have one of the following structures:

(1) TO-$(CF_2O)_{a'}$—$(CF_2CF_2O)_{b'}$—T
  with a'/b' in the range 0.5–2, extremes included, a' and b' being integers such as to give the above indicated molecular weight;

(2) TO-$(C_3F_6O)_r$—$(C_2F_4O)_b$—$(CFXO)_t$-T
  with r/b=0.5–2.0; (r+b)/t is in the range 10–30, b, r and t being integers such as to give the above indicate molecular weight, X has the above indicated meaning;

(3) TO-$(C_3F_6O)_{r'}$—$(CFXO)_{t'}$-T
  t' can be 0;
  when t' is different from 0 then r'/t'=10–100, preferably 10–30; r' and t' being integers such as to give the above indicated molecular weight; X has the above indicated meaning;

In the above indicated formulas:

($C_3F_6O$)— can represent units of formula

—(CF($CF_3$)$CF_2O$)— and/or —($CF_2$—CF($CF_3$)O)—

The T end groups, equal to or different from each other, are (per)fluoroalkyl groups selected from: —$CF_3$, —$C_2F_5$, —$C_3F_7$, —$CF_2Cl$, —$C_2F_4Cl$, —$C_3F_6Cl$; optionally one or two F atoms, preferably one, can be replaced by H.

The indicated fluoropolyethers are obtainable by the well known processes in the prior art, see for example the following patents herein incorporated by reference: U.S. Pat. Nos. 3,665,041, 2,242,218, 3,715,378, and EP 239,123.

PFPEs are commercially known, for example FOMBLIN® commercialized by Ausimont. The preferred ones among them are:

$CF_3O(C_3F_6O)_n(CF_2O)_mCF_3$ wherein n and m are such as to give the above indicated molecular weight values; m/n is in the range 0.01–0.5.

The fluorinated surfactants used in the present invention can be selected from the following:

TO$(C_3F_6O)_n(CF_2O)_mCF_2$COOM wherein M=H, $NH_4$, Na, Li, K and n can range from 1 to 6, T as above defined; m/n is in the range 0.05–0.1

$CF_3(CF_2)_n$COOM wherein n can range from 4 to 12

F—($CF_2$—$CF_2$)$_n$—$CH_2$—$CH_2$—$SO_3$M wherein M=H, $NH_4$, Na, Li, K and n can range from 2 to 5.

Preferably the fluorinated surfactants of the microemulsion (a) have structure (IA).

The functionalized fluoropolyethers of structure (IA) are obtained for example according to the processes mentioned in EP 148482, U.S. Pat. No. 3,810,874. The surfactants of structure (IIA) and (IIIA) are commercial products, for example FLUORAD® FC1013, FORAFAC® 1033D.

Comonomers having an ethylene unsaturation which can be used are of both hydrogenated and fluorinated type; among the hydrogenated ones, ethylene, propylene, acrylic monomers, for example methylmethacrylate, (meth) acrylic acid, hydroxyethylenacrylate, styrene monomers, such as for example styrene, can be mentioned. Among the fluorinated comonomers it can be mentioned:

$C_3$–$C_8$ perfluoroolefins, such as hexafluoropropene (HFP);

$C_2$–$C_8$ hydrogenated fluoroolefins, such as vinyl fluoride (VF), vinylidene fluoride (VDF), trifluoroethylene, perfluoroalkylethylene $CH_2$=CH—Rf, wherein Rf is a $C_1$–$C_6$ perfluoroalkyl, such as hexafluoroisobutene;

$C_2$–$C_6$ chloro- and/or bromo- and/or iodo-fluoroolefins, such as chlorotrifluoroethylene (CTFE);

(per)fluoroalkylvinylethers (PAVE) $CF_2$=CFORf, wherein Rf is a $C_1$–$C_6$ (per)fluoroalkyl, for example $CF_3$, $C_2F_5$, $C_3F_7$;

(per)fluoro-oxyalkylvinylethers $CF_2$=CFOX, wherein X is a $C_1$–$C_{12}$ alkyl, or a $C_1$–$C_{12}$ oxyalkyl, or a $C_1$–$C_{12}$ (per)fluorooxyalkyl having one or more ether groups, for example perfluoro-2-propoxy-propyl;

fluorodioxoles, preferably perfluorodioxoles.

During the polymerization the typical temperatures and pressures of the TFE polymerization processes are used.

The present invention will be better illustrated by the following Examples, which have a merely indicative but not limitative purpose of the scope of the invention itself.

EXAMPLES

Characterization

In Examples 1–13 the properties and the parameters of interest are determined through the analysis and characterization methods herein described.

The determination of the temperature of the first melting and of the heat of crystallization is carried out by the differential calorimetry method, by using a Perkin Elmer calorimeter of the DSC 7 type. About 10 mg of dried polymer are heated from a temperature of 220° C. up to 370° C. at a rate of 10° C./min. The temperature corresponding to the peak of the melting endothermic curve is indicated as the temperature of the first melting of the polymer. After 15 minutes at 370° C., the polymer is cooled up to a temperature of 220° C. at the rate of 10° C./min. The area subtended from the crystallization esothermic curve is integrated and its value, expressed in cal/g, is indicated as heat of crystallization.

The average diameter of the particles is measured by an instrument based on the laser light diffusion, specifically on the Photon Correlation Spectroscopy, equipped with Brookhaven correlator model 2030 AT and with an Argon Laser light source having a wave length 514.5 nm by Spectra-Physics. The latex specimens to be subjected to measurement, are suitably diluted by water filtered at 0.2 µm on Millipore filter. The scattering measure is carried out at room temperature and at a 900 angle. The latex particle diameter is obtained by the cumulant methods.

The polymer content of the latex discharged from the reactor and of the supernatant layer obtained by ultracentrifugation is evaluated by the loss weight at 150° C. for 1 hour. In particular about 20 g of latex are weighed in a glass beaker and placed in a stove to dry for 1 hour at 150° C. The content of dry product of the latex is obtained from the formula:

Dry product %=weight after drying/latex initial weight×100

In order to determine the per cent fraction of the solid separated as a consequence of the ultracentrifugation, one proceeds to normalize the content of the dry product of the supernatant layer after centrifugation with respect to the content of the dry product of the latex before centrifugation, according to the formula:

Separated solid %=(1-dry product in the supernatant layer %/Dry product in the latex %)×100

In order to evaluate the granulometry distribution of the primary particles, the latex is subjected to centrifugation at 5,000 rpm for 1 hour, using a Kontron ultracentrifuge Centrikon model H401. The separated supernatant layer is subjected to determination of the polymer content by weight loss and to determination of the average diameter of the primary particles, as previously described. As it has been described in the prior art (F. Chu, C. Graillat, J. Guillot, A. Guyot, Colloid. Pol. Sci, 275 (1997), 986) this method which uses ultracentrifugation with PCS allows a careful determination of the particle fractions in the polydispersed latex and it gives results which are confirmed by other techniques such as the transmission electronic microscopy (TEM), capillary hydrodynamic fractionation (CHDF) or field-flow fractionation (FFF).

The amorphous index has been determined by IR-spectroscopy according to the Moynihan method (J. Am. Chem. Soc., 1959, 81, 1045) as a ratio of the absorptions A778 and A2365.

Amorphous index=A778/A2365

The absolute specific weight is determined according to ASTM D4895.

The surfactants which are used in Examples 1–13 are the following:

$$CF_3O(C_3F_6O)_n(CF_2O)_mCF_2COOH$$

wherein n can range from 1 to 6, m/n is in the range 0.05–0.1

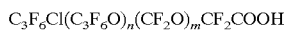
$$C_3F_6Cl(C_3F_6O)_n(CF_2O)_mCF_2COOH$$

wherein n can range between 1 and 5, m/n is in the range 0.05–0.1

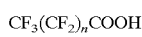
$$CF_3(CF_2)_nCOOH$$

wherein n can range between 4 and 12

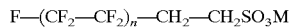
$$F—(CF_2—CF_2)_n—CH_2—CH_2SO_3M$$

wherein M=H, $NH_4$, Na, Li, K and n can range between 2 and 5. The oils used in Examples 1–13 are the following:

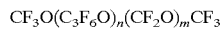
$$CF_3O(C_3F_6O)_n(CF_2O)_mCF_3$$

wherein n can range between 1 and 6; m/n is in the range 0.05–0.1

$$CF_3(CF_2)_nCF_3$$

wherein n can range between 1 and 8.

Example 1

5 parts of an ammonium salt of an acid having the structure (I) with an acidimetric molecular weight 530, 3 parts of a perfluoropolyether having the structure of type (A) and molecular weight of about 700 and 8 parts of water are introduced into a glass beaker. The resulting dispersion is perfectly limpid.

150 grams of the previous dispersion, equal to 0.49 ml/liter of perfluoropolyether, are added to 32 liters of carefully degassed water in a 50 liters autoclave equipped with a mechanical stirrer and previously put under vacuum. Also 140 grams of paraffin with softening point in the range 52° C.–54° C. were previously introduced into the reactor. 500 cc of $(NH_4)_2S_2O_8$ (APS) solution corresponding to 220 mg of APS are fed into the autoclave. The autoclave is maintained under mechanical stirring and is pressurized with TFE up to a pressure of 20 bar at a temperature of 55° C. At this point 500 cc of a $(NH_4)_2Fe(SO_4)_2 6H_2O$ (SdM) solution corresponding to 380 mg of SdM are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 100° C. at a rate equal to 0.7° C./min. During the reaction 56 grams of the aqueous solution containing 100 grams/liter of ammonium perfluorooctanoate are fed into the autoclave. After 80 minutes, the TFE feeding is stopped, when 13,100 grams of TFE have reacted, the reactor is evacuated and cooled.

The diameter of the polymer primary particles measured by Laser Light Scattering (LLS) is equal to 157 nm. After ultracentrifugation at 5,000 rpm for 1 hour, an amount of solid equal to 67% by weight of the total weight is separated and the LLS measure on the supernatant phase gives a value of 78 nm. The measured values show that the obtained dispersion has a bimodal distribution of the particle diameters. By the DSC analysis it results that the average specimen of the Example has a heat of crystallization of 8.8 cal/g., the supernatant phase −9.39 cal/g and the precipitated phase −6.07 cal/g.

By the FT-IR analysis it results that the polymer of the supernatant phase has a value of the amorphous index (Moynihan, 773/2365 cm-1) of 0.12, while that of the precipitated phase is of 0.07.

Example 2

3 parts of an ammonium salt of an acid having the structure (II) with an acidimetric molecular weight 545, 2 parts of a perfluoropolyether having the structure of type (A)

and molecular weight of about 800 and 5 parts of water are introduced into a glass beaker. The resulting dispersion is perfectly limpid in a temperature range from 15° C. to 55° C.

100 grams of the previous dispersion, equal to 0.35 ml/liter of perfluoropolyether, are added to 32 liters of carefully degassed water in a 50 liters autoclave equipped with a mechanical stirrer and previously put under vacuum. Also 140 grams of paraffin with softening point in the range 52° C.–54° C. were previously introduced into the reactor. 500 cc of $(NH_4)_2S_2O_8$ (APS) solution corresponding to 220 mg of APS are fed into the autoclave. The autoclave is maintained under mechanical stirring and it is pressurized with TFE up to a pressure of 20 bar at a temperature of 55° C. At this point 500 cc of a $(NH_4)_2Fe(SO_4)_2 6H_2O$ (SdM) solution corresponding to 380 mg of Sdm are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 100° C. at a rate equal to 0.7° C./min. During the reaction 60 grams of the aqueous solution containing 100 grams/liter of ammonium perfluorooctanoate are fed into the autoclave. After 94 minutes, the TFE feeding is stopped, when 14,800 grams of TFE have reacted, the reactor is evacuated and cooled.

The diameter of the polymer primary particles measured by Laser Light Scattering (LLS) is equal to 155 nm. After ultracentrifugation at 5,000 rpm for 1 hour, an amount of solid equal to 74.6% by weight of the total weight is separated and the LLS measure on the supernatant phase gives a value of 82 nm. The measured values show that the obtained dispersion has a bimodal distribution of the particle diameters.

By the DSC analysis it results that the average specimen of the Example has a heat of crystallization of 8.2 cal/g, the supernatant phase −10.4 cal/g and the precipitated phase −7.1 cal/g. On the average specimen the value of the absolute specific weight SSG=2,171 has been determined which indicates high molecular weight of the obtained polymer.

Example 3

5 parts of an ammonium salt of an acid having the structure (II) with an acidimetric molecular weight 530, 3 parts of a perfluoropolyether having the structure of type (A) and molecular weight of about 700 and 8 parts of water are introduced into a glass beaker. The resulting dispersion is perfectly limpid.

8 grams of the previous dispersion, equal to 0.03 ml/liter of perfluoropolyether, are added to 32 liters of carefully degassed water in a 50 liters autoclave equipped with a mechanical stirrer and previously put under vacuum. Also 11 grams of ammonium perfluorooctanoate and 200 g of paraffin with softening point in the range 52° C.–54° C. were previously introduced into the reactor. 500 cc of $(NH_4)_2S_2O_8$ (APS) solution and disuccinic peroxide (DSAP) corresponding to 100 mg of APS and 2,000 mg of DSAP are fed into the autoclave. The autoclave is maintained under mechanical stirring and it is pressurized with TFE up to a pressure of 20 bar at a temperature of 55° C. At this point 500 cc of a $(NH_4)_2Fe(SO_4)_2 6H_2O$ (SdM) solution corresponding to 90 mg of SdM are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 86° C. at a rate equal to 0.6° C./min. During the reaction 50.5 grams of the aqueous solution containing 100 grams/liter of ammonium perfluorooctanoate are fed into the autoclave. After 109 minutes, the TFE feeding is stopped, when 15,800 grams of TFE have reacted, the reactor is evacuated and cooled.

The diameter of the polymer primary particles measured by Laser Light Scattering (LLS) is equal to 170 nm. After ultracentrifugation at 5,000 rpm for 1 hour, an amount of solid equal to 95.5% by weight of the total weight is separated and the LLS measure on the supernatant phase gives a value of 65 nm. The measured values show that the obtained dispersion has a bimodal distribution of the particle diameters.

Example 4

15 grams of the dispersion of Example 3, equal to 0.05 ml/liter of perfluoropolyether, are added to 32 liters of carefully degassed water in a 50 liters autoclave equipped B with a mechanical stirrer and previously put under vacuum. Also 12 grams of Forafac 1033D, surfactant having the structure (IV) produced and commercialized by Elf Atochem S. A., 200 g of paraffin with softening point in the range 52° C.–54° C. were previously introduced into the reactor. The autoclave is maintained under mechanical stirring and it is pressurized with TFE up to a pressure of 20 bar at a temperature of 70° C. At this point 500 cc of a $(NH_4)_2S_2O_8$ (APS) solution and disuccinic peroxide (DSAP) corresponding to 150 mg of APS and 3,000 mg of DSAP are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 85° C. at a rate equal to 0.33° C./min. During the reaction 50.5 grams of the aqueous solution containing 100 grams/liter of Forafac 1033D are fed into the autoclave. After 120 minutes, the TFE feeding is stopped, when 15,800 grams of TFE have reacted, the reactor is evacuated and cooled.

The diameter of the polymer primary particles measured by Laser Light Scattering (LLS) is equal to 165 nm. After ultracentrifugation at 5,000 rpm for 1 hour, an amount of solid equal to 97% by weight of the total weight is separated and the LLS measure on the supernatant phase gives a value of 55 nm. The measured values show that the obtained dispersion has a bimodal distribution of the particle diameters.

Example 5

25 grams of the dispersion of Example 3, equal to 0.08 ml/liter of perfluoropolyether, are added to 32 liters of carefully degassed water in a 50 liters autoclave equipped with a mechanical stirrer and previously put under vacuum. Also 40 grams of ammonium perfluorooctanoate, 200 g of paraffin with softening point in the range 52° C.–54° C. were previously introduced into the reactor. The autoclave is maintained under mechanical stirring and it is pressurized with TFE up to a pressure of 20 bar at a temperature of 70° C. At this point 500 cc of a $(NH_4)_2S_2O_8$ (APS) solution and disuccinic peroxide (DSAP) corresponding to 150 mg of APS and 3,000 mg of DSAP are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 85° C.

at a rate equal to 0.33° C./min. When 13,000 g of TFE have reacted, 150 g of the microemulsion of Example 3 equal to 0.49 ml/liter of perfluoropolyether are fed into the autoclave, the internal temperature of the autoclave is brought to 92° C. When 13,500 g of TFE have reacted, 28 g of perfluoropropylvinylether (PPVE) are fed into the autoclave. After 100 minutes, the TFE feeding is stopped, when 15,800 grams of TFE have reacted, the reactor is evacuated and cooled.

The diameter of the polymer primary particles measured by Laser Light Scattering (LLS) is equal to 198 nm. After ultracentrifugation at 5,000 rpm for 1 hour, an amount of solid equal to 95.1% by weight of the total weight is separated and the LLS measure on the supernatant phase gives a value of 58 nm. The measured values show that the obtained dispersion has a bimodal distribution of the particle diameters.

Example 6 (Comparative)

24 grams of the aqueous solution of the ammonium perfluorooctanoate are added to 32 liters of carefully degassed water in a 50 liters autoclave equipped with a mechanical stirrer and previously put under vacuum. Also 140 grams of paraffin with softening point in the range 52° C.–54° C. were previously introduced into the reactor. 500 cc of a $(NH_4)_2S_2O_8$ (APS) solution corresponding to 220 mg of APS are fed into the autoclave. The autoclave is maintained under mechanical stirring and it is pressurized with TFE up to a pressure of 20 bar at a temperature of 55° C. At this point 500 cc of a $(NH_4)_2Fe(SO_4)_26H_2O$ (Sdm) solution corresponding to 380 mg of SdM are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 100° C. at a rate equal to 0.7° C./min. During the reaction 60 g of the aqueous solution containing 100 grams/liter of ammonium perfluorooctanoate are fed into the autoclave. After 80 minutes, the TFE feeding is stopped, when 17,400 grams of TFE have reacted, the reactor is evacuated and cooled.

The diameter of the polymer primary particles measured by Laser Light Scattering (LLS) is equal to 200 nm. After ultracentrifugation at 5,000 rpm for 1 hour, an amount of solid equal to 99.8% by weight of the total weight is separated and the LLS measure on the supernatant phase gives a value of 115 nm.

Example 7 (Comparative)

24 grams of an aqueous solution of the ammonium salt of the surfactant having the structure (II) are added to 32 liters of carefully degassed water in a 50 liters autoclave equipped with a mechanical stirrer and previously put under vacuum. Also 140 grams of paraffin with softening point in the range 52° C.–54° C. were previously introduced into the reactor. 500 cc of a $(NH_4)_2S_2O_8$ (APS) solution corresponding to 220 mg of APS are fed into the autoclave. The autoclave is maintained under mechanical stirring and it is pressurized with TFE up to a pressure of 20 bar at a temperature of 55° C. At this point 500 cc of a $(NH_4)_2Fe(SO_4)_26H_2O$ (SdM) solution corresponding to mg of SdM are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 100° C. at a rate equal to 0.7° C./min. During the reaction 60 g of the aqueous solution containing 100 grams/liter of the ammonium salt of the surfactant having the structure (II) are fed into the autoclave. After 80 minutes, the TFE feeding is stopped, when 8,700 grams of TFE have reacted, the reactor is evacuated and cooled.

The diameter of the polymer primary particles measured by Laser Light Scattering (LLS) is equal to 176 nm. After ultracentrifugation at 5,000 rpm for 1 hour, an amount of solid equal to 99.5% by weight of the total weight is separated and the LLS measure on the supernatant phase gives a value of 177 nm.

Example 8 (Comparative)

4 parts of a sodium salt of an acid having the structure (II) with an acidimetric molecular weight 545, 2 parts of a perfluorocarbon $C_8F_{18}$ and molecular weight of about 438 and 4 parts of water are introduced into a glass beaker. The resulting dispersion is perfectly limpid.

325 grams of the previous dispersion, equal to 01.16 ml/liter of perfluorocarbon, are added to 32 liters of carefully degassed water in a 50 liters autoclave equipped with a mechanical stirrer and previously put under vacuum. Also 140 grams of paraffin with softening point in the range 52° C.–54° C. were previously introduced into the reactor. 500 cc of $(NH_4)_2S_2O_8$ (APS) solution corresponding to 220 mg of APS are fed into the autoclave. The autoclave is maintained under mechanical stirring and it is pressurized with TFE up to a pressure of 20 bar at a temperature of 55° C. At this point 500 cc of a $(NH_4)_2Fe(SO_4)_26H_2O$ (SdM) solution corresponding to 380 mg of SdM are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 100° C. at a rate equal to 0.7° C./min. After 42 minutes, the TFE feeding is stopped, when 11,500 grams of TFE have reacted, the reactor is evacuated and cooled.

The diameter of the polymer primary particles measured by Laser Light Scattering (LLS) is equal to 186 nm. After ultracentrifugation at 5,000 rpm for 1 hour, an amount of solid equal to 99.8% by weight of the total weight is separated and the LLS measure on the supernatant phase gives a value of 105

Example 9 (Comparative)

75 grams of the dispersion of Example 8, equal to 0.27 ml/liter of perfluorocarbon, are added to 32 liters of carefully degassed water in a 50 liters autoclave equipped with a mechanical stirrer and previously put under vacuum. Also 140 grams of paraffin with softening point in the range 52° C.–54° C. were previously introduced into the reactor. 500 cc of a $(NH_4)_2S_2O_8$ (APS) solution corresponding to 220 mg of APS are fed into the autoclave. The autoclave is maintained under mechanical stirring and it is pressurized with TFE up to a pressure of 20 bar at a temperature of 55° C. At this point 500 cc of a $(NH_4)_2Fe(SO_4)_26H_2O$ (SdM) solution corresponding to 380 mg of SdM are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 100° C. at a rate equal to 0.7° C./min. During the reaction 60 grams of the aqueous solution containing 100 grams/liter of ammonium perfluorooctanoate are fed into the autoclave. After 76 minutes, the TFE feeding is stopped, when 13,900 grams of TFE have reacted, the reactor is evacuated and cooled.

The diameter of the polymer primary particles measured by Laser Light Scattering (LLS) is equal to 261 nm. After ultracentrifugation at 5,000 rpm for 1 hour, an amount of solid equal to 99.9% by weight of the total weight is separated and the LLS measure on the supernatant phase gives a value of 183.

Example 10 (Comparative)

30 grams of the aqueous solution of ammonium perfluorooctanoate are added to 31 liters of carefully degassed water in a 50 liters autoclave equipped with a mechanical stirrer and previously put under vacuum. Also 140 grams of paraffin with softening point in the range 52° C.–54° C. and 100 grams of perfluoropropylvinylether (PPVE) were previously introduced into the reactor. 500 cc of a $(NH_4)_2S_2O_8$ (APS) solution corresponding to 1000 mg of APS are fed into the autoclave. The autoclave is maintained under mechanical stirring and it is pressurized with TFE up to a pressure of 20 bar at a temperature of 55° C. At this point 500 cc of a $(NH_4)_2Fe(SO_4)_2 6H_2O$ (SdM) solution corresponding to 1,450 mg of SdM are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 75° C. at a rate equal to 0.7° C./min. After 27 minutes, the TFE feeding is stopped, when 3,500 grams of TFE have reacted, the reactor is evacuated and cooled.

The diameter of the polymer primary particles measured by Laser Light Scattering (LLS) is equal to 115 nm. After ultracentrifugation at 5,000 rpm for 1 hour, an amount of solid equal to 92% by weight of the total weight is separated and the LLS measure on the supernatant phase gives a value of 85 nm.

Example 11 (Comparative)

160 grams of the microemulsion of Example 3, equal to 0.52 ml/liter of perfluoropolyether are added to 32 liters of carefully degassed water in a 50 liters autoclave equipped with a mechanical stirrer and previously put under vacuum. Also 100 grams of perfluoromethylvinylether (PMVE) were previously introduced into the reactor. 500 cc of a $(NH_4)_2S_2O_8$ (APS) solution corresponding to 1,600 mg of APS are fed into the autoclave. The autoclave is maintained under mechanical stirring and it is pressurized with TFE up to a pressure of 20 bar at a temperature of 30° C. At this point 500 cc of a $(NH_4)_2Fe(SO_4)_2 6H_2O$ (SdM) solution corresponding to 480 mg of SdM are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 60° C. at a rate equal to 0.7° C./min. After 36 minutes, the TFE feeding is stopped, when 7,900 grams of TFE have reacted, the reactor is evacuated and cooled.

The diameter of the polymer primary particles measured by Laser Light Scattering (LLS) is equal to 83 nm. After ultracentrifugation at 5,000 rpm for 1 hour, an amount of solid equal to 28.39 by weight of the total weight is separated and the LLS measure on the supernatant phase gives a value of 79 nm.

Example 12 (Comparative)

140 grams of the microemulsion of Example 3, equal to 0.44 ml/liter of perfluoropolyether are added to 30 liters of carefully degassed water in a 50 liters autoclave equipped with a mechanical stirrer and previously put under vacuum. Also 140 grams of paraffin with softening point in the range 52° C.–54° C. were previously introduced into the reactor. The autoclave is maintained under mechanical stirring and it is pressurized with TFE up to a pressure of 20 bar at a temperature of 80° C. At this point 500 cc of a $(NH_4)_2S_2O_8$ (APS) solution corresponding to 2,500 mg of APS are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 100° C. at a rate equal to 1.0° C./min. After 25 minutes, the TFE feeding is stopped, when 13,500 grams of TFE have reacted, the reactor is evacuated and cooled.

The diameter of the polymer primary particles measured by Laser Light Scattering (LLS) is equal to 90 nm. After ultracentrifugation at 5,000 rpm for 1 hour, an amount of solid equal to 31% by weight of the total weight is separated and the LLS measure on the supernatant phase gives a value of 69 nm.

Example 13 (Comparative)

3 parts of an ammonium salt of an acid having the structure (II) with an acidimetric molecular weight 545, 2 parts of a perfluoropolyether having the structure of type (A) and molecular weight of about 800 and 5 parts of water are introduced into a glass beaker. The resulting dispersion is perfectly limpid.

433 grams of the previous dispersion, equal to 1.55 ml/liter of perfluoropolyether, are added to 30 liters of carefully degassed water in a 50 liters autoclave equipped with a mechanical stirrer and previously put under vacuum. Also 140 grams of paraffin with softening point in the range 52° C.–54° C. were previously introduced into the reactor. 500 cc of a $(NH_4)_2S_2O_8$ (APS) solution corresponding to 220 mg of APS are fed into the autoclave. The autoclave is maintained under mechanical stirring and it is pressurized with TFE up to a pressure of 20 bar at a temperature of 55° C. At this point 500 cc of a $(NH_4)_2Fe(SO_4)_2 6H_2O$ (SdM) solution corresponding to 380 mg of SdM are fed into the autoclave.

When the pressure in the reactor has decreased of 0.5 bar, one starts to feed TFE by a compressor so as to maintain a constant pressure of 20 bar inside the reactor. Meanwhile the internal temperature of the reactor is increased up to 100° C. at a rate equal to 0.75° C./min. After 45 minutes, the TFE feeding is stopped, when 14,700 grams of TFE have reacted, the reactor is evacuated and cooled.

The diameter of the polymer primary particles measured by Laser Light Scattering (LLS) is equal to 115 nm. After ultracentrifugation at 5,000 rpm for 1 hour, an amount of solid equal to 44.59 by weight of the total weight is separated and the LLS measure on the supernatant phase gives a value of 88 nm.

TABLE 1

| | Microemulsion | | | | Other surfactant | | Iniziators | | | Comonomer | |
| | Surfactant | | Oil | | Initial | Feeding under | | | | | |
| Example | Type | Amount g/l H₂O | Type | Amount ml/l H₂O | Type | feeding g/l H₂O | reaction g/l H₂O | APS mg | DSAP mg | SdM mg | Type | Amount g |
|---|---|---|---|---|---|---|---|---|---|---|---|---|
| 1 | I | 1.43 | A | 0.49 | III | 0 | 1.75 | 220 | — | 380 | — | |
| 2 | II | 0.75 | A | 0.35 | III | 0 | 1.87 | 220 | — | 380 | — | |
| 3 | II | 0.08 | A | 0.03 | III | 0.344 | 1.57 | 100 | 2000 | 90 | — | |
| 4 | II | 0.14 | A | 0.05 | IV | 0.375 | 1.57 | 150 | 3000 | — | — | |
| 5 | II | 0.14 | A | 0.05 | III | 1.375 | — | 150 | 3000 | — | PPVE | 28 |
| 6 comp. | — | — | — | — | III | 0.75 | 1.87 | 220 | — | 380 | — | |
| 7 comp. | — | — | — | — | II | 0.75 | 1.87 | 220 | — | 380 | — | |
| 8 comp. | II | 4.06 | B | 1.16 | — | — | — | 220 | — | 380 | — | |
| 9 comp. | II | 4.06 | B | 0.27 | III | 0 | 1.87 | 220 | — | 380 | — | |
| 10 comp. | — | — | — | — | III | 0.968 | — | 1000 | — | 1450 | PPVE | 100 |
| 11 comp. | II | 1.5 | A | 0.52 | — | — | — | 1600 | — | 480 | PPVE | 56 |
| 12 comp. | II | 1.42 | A | 0.44 | — | — | — | 2500 | — | — | — | |
| 13 comp. | II | 4.33 | A | 1.55 | — | — | — | 220 | — | 380 | — | |

TABLE 2

| | Latex | | | 5000 RPM | | |
|---|---|---|---|---|---|---|
| Example | concentration (% by wt.) | C₂F₄ conversion (Kg) | Average diameter (nm) | Supernatant (%) | Dp supernat. (nm) | Dp supern/ average Dp |
| 1 | 28.4 | 13.1 | 157 | 33 | 78 | 0.49 |
| 2 | 31.0 | 14.8 | 155 | 25.4 | 82 | 0.53 |
| 3 | 32.4 | 15.8 | 170 | 4.5 | 65 | 0.38 |
| 4 | 32.4 | 15.8 | 165 | 3.1 | 55 | 0.33 |
| 5 | 32.4 | 15.8 | 198 | 4.9 | 58 | 0.29 |
| 6 comp. | 34.5 | 17.4 | 210 | 0.2 | 115 | 0.55 |
| 7 comp. | 20.9 | 8.7 | 176 | 0.5 | 177 | 1.01 |
| 8 comp. | 25.8 | 11.5 | 186 | 0.2 | 105 | 0.56 |
| 9 comp. | 29.6 | 13.9 | 261 | 0.1 | 183 | 0.70 |
| 10 comp. | 9.9 | 3.5 | 115 | 8 | 85 | 0.74 |
| 11 comp. | 19.3 | 7.9 | 83 | 71.7 | 79 | 0.95 |
| 12 comp. | 30.3 | 13.5 | 90 | 69 | 69 | 0.77 |
| 13 comp. | 32.2 | 14.7 | 115 | 55.5 | 88 | 0.77 |

What is claimed is:

1. A process for the preparation of a dispersion based on tetrafluoroethytlene (TFE) homopolymers, or based on copolymers thereof with one or more monomers containing at least one unsaturation of ethylene type in amounts from 0 up to 10% by moles, said dispersion having a multimodal or bimodal distribution of the particle diameters, the dispersion having an average diameter in the range 100 nm–400 nm, the fraction of small particles having diameter between 10 and 100 nm is in the range 1.5–35% by weight calculated on the dry product;
the ratio between the average diameter of the small particles with respect to the average diameter of the dispersion obtained from a polymerization being in the range 0.025–0.6; said process comprising:
   a) preparing an aqueous microemulsion comprising fluorinated surfactants and (per)fluoropolyether (PFPE) oils having non reactive end groups, optionally containing 1 or more H and/or Cl atoms instead of fluorine;
   b) feeding the microemulsion into the polymerization reactor before the beginning of the polymerization or after the polymerization has started;
   c) feeding at least one fluorinated surfactant into the reactor before the starting of the polymerization or after the polymerization has started;
   d) adding water (reaction medium) into the reactor, adding gaseous TFE and pressurizing the reactor, optionally adding comonomers, chain transfer agents, stabilizers;
   e) adding the initiator, and optionally during the polymerization, adding further amounts of comonomers, initiators, chain transfer agents;
   f) discharging the polymer latex from the reactor; wherein
      before the beginning of the reaction at least a part of the b) and/or c) feedings must be carried out.

2. A process according to claim 1, wherein the amount of the surfactant fed before polymerization starts is higher than 0.05 grams for liter of water, the total amount of the fed surfactant being in the range 0.3–10 g for liter of water.

3. A process according to claim 1, wherein the amount of the fluorinated surfactant in the microemulsion a) is in the range 1–80% by weight, with respect to the total weight of surfactants a)+c).

4. A process according to claim 1, wherein in order to obtain trimodal or higher distributions of the particles, a fluorinated surfactant c) and the microemulsion a) are fed into the reactor at different reaction progress degrees.

5. A process according to claim 1, wherein the perfluoropolyether oil phase of the microemulsion a) is present in an amount from 0.002 to 10 ml for liter of water.

6. A process according to claim 1, wherein the number average molecular weight of the perfluoropolyethers (PFPE) of the microemulsion a) is in the range 350–8,000, the perfluoropolyether chain comprises repeating units having at least one structure, statistically placed along the chain, selected from the group consisting of:
(CFXO), $(CF_2CF_2O)$, $(CF_2CF_2CF_2O)$, $(CF_2CF_2CF_2CF_2O)$, $(CR_4R_5CF_2CF_2O)$, $(CF(CF_3)CF_2O)$ and $(CF_2CF(CF_3)O)$, wherein X=F, $CF_3$;
$R_4$ and $R_5$, equal to or different from each other, are selected from the group consisting of H, Cl, and perfluoroalkyl from 1 to 4 carbon atoms.

7. A process according to claim 6, wherein PFPE has a structure selected from the group consisting of:
1) TO-$(CF_2O)_{a'}$—$(CF_2CF_2O)_{b'}$-T
   with a'/b' in the range 0.5–2, extremes included, a' and b' being integers that give the above indicated molecular weight;

2) TO-(C$_3$F$_6$O)$_{r'}$—(C$_2$F$_4$O)$_b$—(CFXO)$_t$-T
with r/b–0.5–2.0; (r+b)/t is in the range 10–30, b, r and t being integers that give the above indicated molecular weight, X has the above indicated meaning; and 3) TO-(C$_3$F$_6$O)$_{r'}$—(CFXO)$_{t'}$-T
t' can be 0;
when t' is different from 0 then r'/t'=10–100; r' and t' being integers that give the above indicated molecular weight; X has the above indicated meaning;
the T end groups, equal to or different from each other, are (per)fluoroalkyl groups selected from the group consisting of: —CF$_3$, —C$_2$F$_5$, —C$_3$F$_7$, —CF$_2$Cl, —C$_2$F$_4$Cl and —C$_3$F$_6$Cl; optionally one or two F atoms can be replaced by H.

8. A process according to claim 7, wherein the PFPE has the structure:

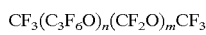
CF$_3$(C$_3$F$_6$O)$_n$(CF$_2$O)$_m$CF$_3$ wherein n and m give the above indicated molecular weight values; m/n is in the range 0.01–0.5.

9. A process according to claim 1, wherein the fluorinated surfactants are selected from the group consisting of:

TO(C$_3$F$_6$O)$_n$(CF$_2$O)$_m$CF$_2$COOM    (IA)

wherein M=H, NH$_4$, Na, Li or K and n ranges from 1 to 6, T is as above defined; m/n is in the range 0.05–0.1;

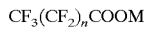
CF$_3$(CF$_2$)$_n$COOM    (IIA)

wherein M is as above defined and n ranges from 4 to 12; and

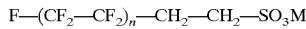
F—(CF$_2$—CF$_2$)$_n$—CH$_2$—CH$_2$—SO$_3$M    (IIIA)

wherein M is as above defined and n ranges from 2 to 5.

10. A process according to claim 9, wherein the fluorinated surfactants of the microemulsion (a) have structure (IA).

11. A process according to claim 1, wherein the comonomers having an ethylene unsaturation are hydrogenated and/or fluorinated.

12. A process according to claim 11, wherein the fluorinated comonomers are selected from the group consisting of:

C$_3$–C$_8$ perfluoroolefins;
C$_2$–C$_8$ hydrogenated fluoroolefins;
C$_2$–C$_6$ chloro- and/or bromo- and/or iodo-fluoroolefins;
(per)fluoroalkylvinylethers (PAVE) CF$_2$=CFORf, wherein Rf is a C$_1$–C$_6$ (per)fluoroalkyl;
(per)fluoro-oxyalkylvinylethers CF$_2$=CFOX, wherein X is a C$_1$–C$_{12}$ alkyl, or a C$_1$–C$_{12}$ oxyalkyl, or a C$_1$–C$_{12}$ (per)fluorooxyalkyl having one or more ether groups; and
fluorodioxoles.

13. A process according to claim 12, wherein the fluorinated comonomers are selected from the group consisting of:

hexafluoropropene (HFP);
chlorotrifluoroethylene (CTFE);
(per)fluoroalkylvinylethers (PAVE) CF$_2$=CFORf, wherein Rf is a C$_1$–C$_3$ (per)fluoroalkyl; and
perfluorodioxoles.

14. A process as claimed in claim 1, wherein the dispersion has an average diameter in the range 150 nm–300 nm.

15. A process as claimed in claim 1, wherein the fraction of small particles having diameter between 10 and 100 nm is in the range 3–25% by weight.

16. A process as claimed in claim 1, wherein the (per)fluoropolyether oils have (per)fluorinated end groups, and the fluorinated surfactant is perfluoroxinated.

17. A process as claimed in claim 12, wherein R$_f$ is CF$_3$, C$_2$F$_5$, C$_3$F$_7$, X is perfluoro-2-propoxy-propyl, and the fluorodioxoles are perfluorodioxoles.

18. A process according to claim 12, wherein the
C$_3$–C$_8$ perfluoroolefins are hexafluoropropene (HFP);
C$_2$–C$_8$ hydrogenated fluoroolefins are vinyl fluoride (VF), vinylidene fluoride (VDF), trifluoroethylene or perfluoroalkylethylene CH$_2$=CH—Rf, wherein Rf is a C$_1$–C$_6$ perfluoroalkyl; and
C$_2$–C$_6$ chloro-fluoroolefins are chlorotrifluoroethylene (CTFE).

* * * * *